(12) United States Patent
Beckford et al.

(10) Patent No.: US 9,914,152 B2
(45) Date of Patent: Mar. 13, 2018

(54) POLYTETRAFLUOROETHYLENE THIN FILM WITH POLYDOPAMINE ADHESIVE LAYER

(71) Applicant: SURFTEC, LLC, Fayetteville, AR (US)

(72) Inventors: Samuel George Beckford, Fayetteville, AR (US); Min Zou, Fayetteville, AR (US); Justin K Carter, Little Rock, AR (US)

(73) Assignee: Surftec, LLC, Fayetteville, AR (US)

( * ) Notice: Subject to any disclaimer, the term of this patent is extended or adjusted under 35 U.S.C. 154(b) by 0 days.

(21) Appl. No.: 14/324,347

(22) Filed: Jul. 7, 2014

(65) Prior Publication Data

US 2015/0010709 A1 Jan. 8, 2015

Related U.S. Application Data

(60) Provisional application No. 61/843,100, filed on Jul. 5, 2013.

(51) Int. Cl.

| | |
|---|---|
| *B05D 1/36* | (2006.01) |
| *B05D 7/00* | (2006.01) |
| *B05D 7/14* | (2006.01) |
| *B05D 5/08* | (2006.01) |
| B05D 1/18 | (2006.01) |
| B82Y 30/00 | (2011.01) |

(52) U.S. Cl.
CPC ............... *B05D 7/54* (2013.01); *B05D 5/083* (2013.01); *B05D 7/14* (2013.01); *B05D 1/18* (2013.01); *B82Y 30/00* (2013.01)

(58) Field of Classification Search
CPC . B05D 5/083; B05D 7/14; B05D 7/54; B05D 1/18; B82Y 30/00

USPC ........................................................ 427/385.5
See application file for complete search history.

(56) References Cited

U.S. PATENT DOCUMENTS 4,049,863 A * 9/1977 Vassiliou ................ C08L 79/08
427/388.1

OTHER PUBLICATIONS

Xiang et al. "On the Tribological Properties of PTFE Filled with Alumina Nanoparticles and Graphite" Journal of Reinforced Plastics and Composites (2007) vol. 26 No. 3 331-339.*
Potts et al. "Graphene-based polymer nanocomposites" Polymer 52 (2011) 5-25.*
Ou et al. "Mechanical property and corrosion resistance of zirconia/polydopamine nanocomposite multilayer films fabricated via a novel non-electrostatic layer-by-layer assembly technique" Surface and Interface Analysis vol. 43, Issue 4 (2011) 803-808.*
Lee "Bioadhesion of Mussels and Geckos: Molecular Mechanics, Surface Chemistry, and Nanoadhesives" Northwestern University Dissertation (2008).*

* cited by examiner

*Primary Examiner* — Robert S Walters, Jr.
(74) *Attorney, Agent, or Firm* — Kutak Rock LLP; Bryan P. Stanley

(57) ABSTRACT

One aspect of the present invention relates to a method of fabricating a low friction, wear resistant, polydopamine/polytetrafluoroethylene layered film. In one embodiment, the method comprises the deposition of a polydopamine film on a stainless steel substrate through an oxidative polymerization process, the deposition of a polytetrafluoroethylene nanoparticle film on top of the polydopamine film, and heat treating the layered film to remove moisture and fuse the particles together.

18 Claims, 13 Drawing Sheets

POLYTETRAFLUOROETHYLENE THIN FILM WITH POLYDOPAMINE ADHESIVE LAYER

CROSS-REFERENCE TO RELATED APPLICATIONS

This application claims priority to and the benefit of, pursuant to 35 U.S.C. 119 (e), U.S. Provisional Patent Application Ser. No. 61/843,100, filed Jul. 5, 2013, entitled "POLYTETRAFLUOROETHYLENE THIN FILM WITH POLYDOPAMINE ADHESIVE LAYER," by Samuel George Beckford, Min Zou, and Justin Carter, which is incorporated herein in its entirety by reference.

Some references, which may include patents, patent applications and various publications, are cited and discussed in the description of this invention. The citation and/or discussion of such references is provided merely to clarify the description of the disclosure and is not an admission that any such reference is "prior art" to the disclosure described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [12] represents the 12th reference cited in the reference list, namely, S. Beckford, M. Zou, Wear resistant PTFE thin film enabled by a polydopamine adhesive layer, Appl. Surf. Sci. 292 (2014) 350-356.

STATEMENT REGARDING FEDERALLY SPONSORED RESEARCH OR DEVELOPMENT

This invention was made with government support under grant numbers CMS-0645040 and EPS-10003970, awarded by the National Science Foundation. The government has certain rights in the invention.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the disclosure.

Traditionally, petroleum-based oils and greases have played a dominant role in applications requiring lubrication. However, with new technology needing lubrication in extreme conditions such as high temperature, high pressure, maintenance free systems, low-emission systems, and use in high vacuum [1], much emphasis has been placed in the development of effective solid lubricants which can be coated onto component's surfaces. Using recent advances in coating technology, it is now possible to apply thin layers of solid lubricants on surfaces, which changes both the chemical and physical properties of the surface. These films have the potential of being used for applications in microelectromechanical systems (MEMS), biomedical devices, and machine components in order to reduce energy losses due to friction, as well as reducing corrosion and surface fouling.

Polytetrafluoroethylene (PTFE), commonly known by its brand name Teflon, has particularly drawn much attention as a solid lubricant. It is attractive because of its self-lubricating properties, low coefficient of friction (COF), high temperature resistance, and chemical resistance [2,3]. However, PTFE is highly susceptible to wear, and as such, PTFE alone cannot be used in most applications. Because of this, many investigations have focused on creating PTFE composites that possess a greater wear resistance. PTFE composites with various micro and nanoparticle fillers such as glass fiber [4], alumina [5], and graphite [6], have been studied. These investigations have been carried out on bulk PTFE. Although there has been much progress made in the tribological study of bulk PTFE, there has been less focus placed on the tribological performance of PTFE thin films [7].

The wear behavior of PTFE films is not only characterized by local wear of the PTFE film itself, but also by the delamination of the film [8] resulting from weak adhesion of the film to the substrate. To increase the adhesion of film to substrate, investigators have used surface roughening techniques as well as primer coats to allow PTFE to physically lock and adhere to the surface. Primers such as polyamide acid [9] and fluorinated ethylene propylene/PTFE blends [10] have commonly been used for this purpose. To ensure durability, these films have typical thicknesses above 20 μm [9, 10]. The large thickness of these films, as well as the need for large peak-to-valley roughness on the substrate surface, limits their use in many applications where thin films are required.

In order to increase the wear resistance of PTFE thin films without the use of surface roughening and thick coatings, it is important to find a material with strong affinity to both PTFE and the substrate. Polydopamine (PDA) has been found to adhere well to many organic and inorganic materials, including PTFE [11]. PDA is synthesized through an oxidative reaction and is rich in 3,4-dihydroxy-L-phenylalanine (DOPA) and lysine peptides. Although the exact mechanism behind the adhesive property of PDA is not known, it is believed that the catechol functional groups in DOPA and amine in lysine play a significant role in the process [11]. These properties of PDA have only recently been discovered, and thus few studies have been completed on the tribological performance of PDA films.

Therefore, a heretofore unaddressed need exists in the art to address the aforementioned deficiencies and inadequacies. This invention addresses the aforementioned deficiencies by utilizing a PDA adhesive layer to improve the tribological performance of a PTFE top coat. The results show a similar COF ranging between 0.04 and 0.06 for a PDA/PTFE film compared to a PTFE film alone. Due to the strong adhesion between PTFE and PDA, the PDA/PTFE film is able to withstand approximately 500 times more rubbing cycles than the PTFE film alone. A tenacious layer of PTFE remains strongly adhered to the PDA film, and contributes to the durability of the film [12].

BRIEF SUMMARY OF THE INVENTION

The present invention is directed to the use of thin PTFE films with a PDA adhesive layer with or without the addition of various micro and nanoparticle fillers such as, graphene oxide, graphite, and copper to reduce the wear rate of the PTFE film. The resulting film is both wear resistant and has a low coefficient of fiction. The aforementioned film has many possible applications for the purpose of providing lubrication, but can also be used in applications where a durable film or coating is required or desired for purposes such as corrosion prevention or anti-fouling. Other possible useful properties of the resulting film for applications include: non-stick superhydrophobic, or self-cleaning coatings.

These and other features, objects, and advantages of the present invention will become better understood from a consideration of the following detailed description of the preferred embodiments and appended claims in conjunction with the drawings as described in the following:

DETAILED DESCRIPTION OF THE PREFERRED EMBODIMENT(S)

Figure 1:
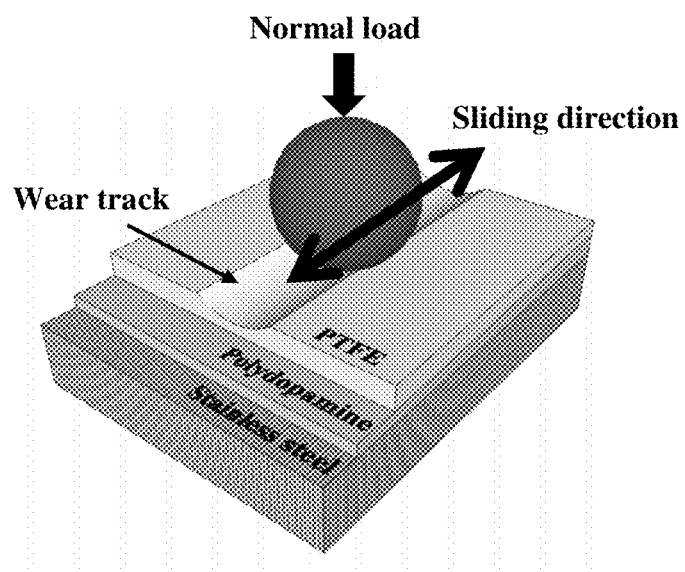
FIG. 1 is a schematic of the fabricated sample and tribological testing setup.

Before the present invention is described in further detail, it should be understood that the invention is not limited to the particular embodiments described, and that the terms used in describing the particular embodiments are for the purpose of describing those particular embodiments only, and are not intended to be limiting.

The preferred embodiment of the present invention is a multilayer low friction coating comprised of PDA and PTFE stacked layers.

In another embodiment the PTFE layer is composed of a PTFE matrix having micro and nanoparticle fillers. The fillers can be a variety of wear reducing particles, including, but not limited to graphene oxide, graphite, and copper.

The term "PTFE" as used herein, refers to polytetrafluoroethylene and all its derivatives, composites, and copolymers in which polytetrafluoroethylene is the main component.

The term "FDA" as used herein refers to polydopamine, noncovalent aggregates of dopamine and 5,6-dihydroxyindole, and any polydopamine composite in which polydopamine is the main component.

IMPLEMENTATION AND EXAMPLES OF THE INVENTION

Without intent to limit the scope of the invention, exemplary methods and their related results according to the embodiments of the present invention are given below. Note that titles or subtitles may be used in the examples for convenience of the reader, which in no way should limit the scope of the invention. Moreover, certain theories are proposed and disclosed herein; however, in no way, whether they are right or wrong, should limit the scope of the invention so long as the invention is practiced according to the invention without regard for any particular theory or scheme of action.

Example 1

In this example, the deposited PDA layer has a coating thickness ranging between 50 and 200 nm. The PTFE layer has a coating thickness ranging between 500 and 600 nm.

For the deposition of both PDA and PTFE films, as described more fully below, the facile method of dip coating is used. As an alternative embodiment, however, the film can also be deposited by soaking in solution, spray coating, roll coating, spin coating process, or any combination thereof. After coating, the sample is heated at a series of temperatures below the melting point of PTFE while cooling the coated sample to room temperature between each heating step. Heating below the melting point of PTFE protects against potential degradation of the PDA layer.

To characterize the tribological performance of the coating produced through the method in this example, two sample types were fabricated and analyzed: stainless steel coated with PTFE and stainless steel coated with the PDA/PTFE coating according to the invention. The substrates for each sample type were 0.03 inch-thick Corrosion Resistant stainless steel sheets (type 316, McMaster-CARR, USA) with Mirror-Like Finish. These sheets were first cut into 2.5 cm by 2.5 cm square samples and then cleaned with acetone in an ultrasonic bath for 20 minutes. The square samples were then soaked in isopropyl alcohol in an ultrasonic bath for 5 minutes and rinsed in deionized (DI) water. The cleaning process was finalized by blow drying the samples using a nitrogen gas blower.

The following step was to mix two separate dipping solutions, PDA and colloidal PTFE. For the PDA solution, Trizma base (T1503, Sigma Aldrich, St. Louis, Mo.) and dopamine hydrochloride (H8502, Sigma Aldrich, St. Louis, Mo.) were combined to produce a PDA pH 8.5 solution. As described by H. Lee in the article, "Mussel-inspired surface chemistry for multifunctional coatings", the PDA coating was deposited in the following manner. First, the Trizma base was mixed with DI water to produce a 10 mM concentration of Tris buffer solution. Second, dopamine hydrochloride was mixed into the buffer solution at a concentration of 2 mg/mL to initialize the polymerization process [13].

For the PTFE solution, a PTFE nanoparticle aqueous dispersion (TE-3859, DuPont, USA) was used. This dispersion has a PTFE solids concentration of 60% by wt as-received and has particles ranging from 0.05 to 0.5 μm in diameter. In order to produce thinner coats of PTFE, the concentration of the as-received PTFE dispersion was diluted to a 40% by wt concentration using DI water.

For the PTFE only sample, stainless steel square sheets were dip coated in the PTFE solution at an insertion and withdrawal speed of 10 mm/min and immersion duration of 20 sec using a Dip Coater (KSV DC, KSV Instruments Ltd., Espoo, Finland). For the second sample type, PDA/PTFE, the stainless steel sheets were first dipped into the PDA solution at an insertion and withdrawal speed of 10 mm/min and immersion duration of 24 hours. The samples were subsequently rinsed in DI water in an ultrasonic bath for 5 minutes and dried using a nitrogen blower. The final top coat of PTFE was deposited using a 10 mm/min dip coating insertion and withdrawal speed and immersion duration of 20 sec. Once dip coating was completed, the samples were dried on a hot plate at 120° C. for 2 min and then heat treated in a furnace at a temperature of 250° C. for 10 min.

In order to compare the performance of one sample type to the other, both sample types were coated with PTFE using the same dip coating parameters. The PTFE only sample had a total film thickness of approximately 580 nm, while the PDA/PTFE sample had a total thickness of 720 nm. The film thickness of the PDA layer was approximately 120 nm. Subtracting this value from the total thickness of PDA/PTFE reveals a PTFE top coat thickness of about 600 nm, which is consistent with the film thickness of the PTFE-only sample.

Tribological testing of the samples was performed using an automatic friction abrasion analyzer (Triboster TS-501, Kyowa Interface Science Co., Ltd., Niiza-City, Japan). The friction abrasion analyzer functions in a linear reciprocating motion, measuring the friction force as the counterface slides across the surface. The counterface used was a 7 mm diameter chrome steel ball (SUJ-2, Kyowa Interface Science Co., Ltd., Niiza-City, Japan), and the test was performed under a 50 g normal load, 2.5 mm/s sliding speed, and 15 mm stroke length. The use of a small diameter chrome steel ball as a counterface, results in a point contact between the ball and the sample, producing significantly high contact pressures under a load of 50 g. The high contact pressure accelerated the wear process, allowing comparisons to be made between samples at reasonable testing durations. To maintain consistency, all tribological tests were performed by rubbing the samples in a direction parallel to the polishing lines of the stainless steel substrates. This testing setup is depicted in FIG. 1.

For the two samples, two different tribological studies were carried out. The first study was a friction and durability study. From this study, the COF of the films, under the testing conditions, as well as the number of rubbing cycles at which the film is sufficiently rubbed off/damaged to produce a sharp increase in the COF (failure point) were determined. The number of rubbing cycles before failure can therefore be used as a measure of the durability of the film.

The second study allowed the observation of the wear progression on each film. In this study, for PTFE only, the friction tests were carried out for 1, 10, 60 and 1000 cycles. For PDA/PTFE, the friction tests were carried out for 1, 10, 60, 1000, and 4000 cycles. Each wear track's cross sectional profile was then used to analyze the wear progression.

Figure 2:
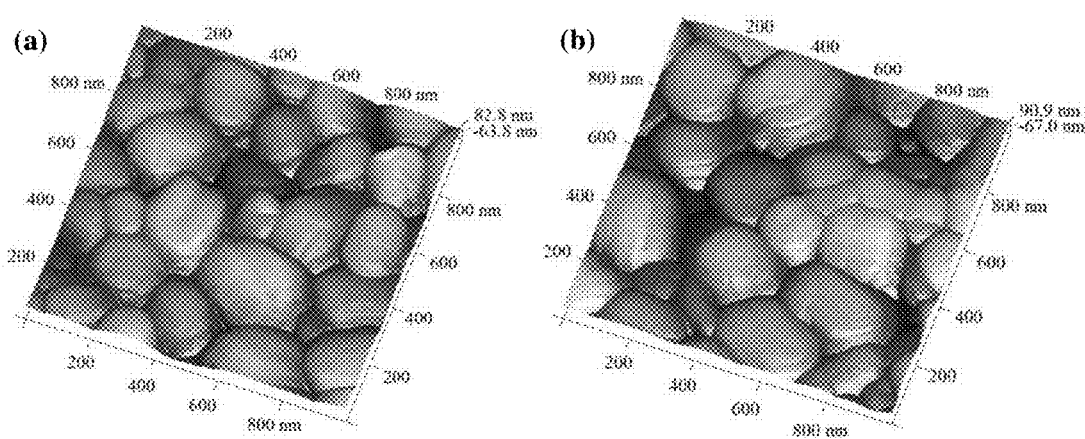
FIGS. 2(a) and 2(b) are atomic force microscopy (AFM) images of (a) PTFE and (b) PDA/PTFE film topography of samples heated to 250° C.

The surface topography of both PTFE and PDA/PTFE coated films were characterized using AFM. FIGS. 2(a) and 2(b) show AFM images that depict the discrete PTFE nanoparticles present in PTFE and PDA/PTFE films, respectively. Each PTFE nanoparticle is pebble shaped with lengths ranging between 100 to 400 nm, which coincides with the nominal value of 0.05-0.5 μm provided by the manufacturer. In addition, as a result of the heat treatment process during the sample fabrication, it is evident that the individual nanoparticles have begun to fuse together. There is very little discernible difference between the surface topography of the two sample types. PDA/PTFE has an average surface roughness, Ra, of approximately 20.8 nm, while PTFE has an Ra value of about 21.6 nm. The root mean square roughness Rq was also similar for both sample types, with a value of 24.6 nm for PDA/PTFE and a value of 27.5 nm for PTFE.

Figure 3:
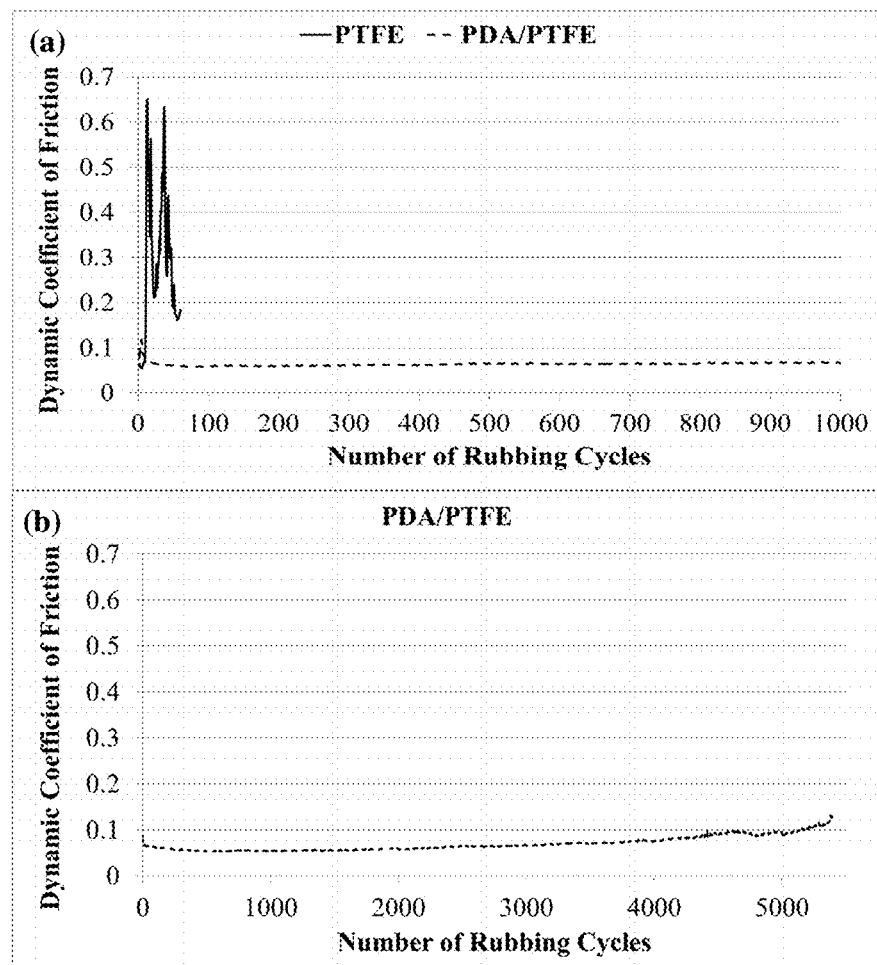
FIGS. 3(a) and 3(b) are graphs showing the dynamic coefficient of friction vs. rubbing cycles for (a) PTFE film and PDA/PTFE film rubbed for 1000 cycles, and (b) PDA/PTFE rubbed for 5400 cycles.

FIGS. 3(a) and 3(b) show the results for the dynamic COF as a function of rubbing cycles. The sample coated with PTFE only, shown in solid line in FIG. 3(a), demonstrates a low COF of approximately 0.06 at the onset of the test, but the COF quickly rises to approximately 0.65 after only 10 rubbing cycles. These results indicate that the film has failed, and the stainless steel substrate is now exposed to the counterface. The PDA/PTFE sample, shown in a dashed line, has a COF that remains stable at approximately 0.06 for 1000 rubbing cycles. To test the durability of this film, the friction test was repeated for a longer duration as shown in FIG. 3(b). The COF shows a slightly increasing trend from 0.06 to 0.1 over 5370 cycles, with a sharp increase in the COF at 5370 cycles, indicating film failure. These results show that the PDA/PTFE film was able to withstand more than 500 times the number of rubbing cycles of a PTFE-only film.

Figure 4:
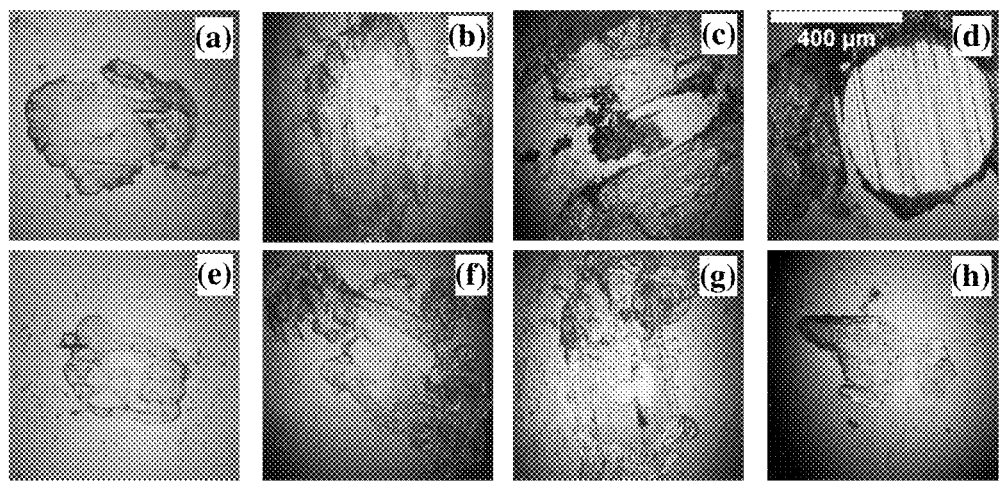
FIGS. 4(a)-(d) and 4(e)-(h) are optical microscope images of the wear scar produced on the chrome steel ball counterface after rubbing against PTFE film for (a) 1 cycle, (b) 10 cycles, (c) 60 cycles, (d) 1000 cycles and against PDA/PTFE film for (e) 1 cycle, (f) 10 cycles, (g) 60 cycles and (h) 1000 cycles at 10× magnification.

Optical images of the chrome steel ball counterface are shown in FIGS. 4(a)-4(h). As shown in FIGS. 4(a) and 4(e), PTFE only and PDA/PTFE both formed a transfer film on the counterface after only the first rubbing cycle. In both sample types, transfer material accumulates on the counterface as the number of cycles increase. After 60 cycles, as shown in FIG. 4(c), the sample with PTFE only has already failed. Part of the transfer film has been removed from the counterface as a result of contact between the counterface and the substrate. After 1000 cycles, as shown in FIG. 4(d), the damage to the counterface is significant, and deep grooves are visible inside the contact area. The PDA/PTFE sample, on the other hand, shows no damage to the counterface for up to 1000 cycles as seen in FIGS. 4(e)-4(h).

Figure 5:
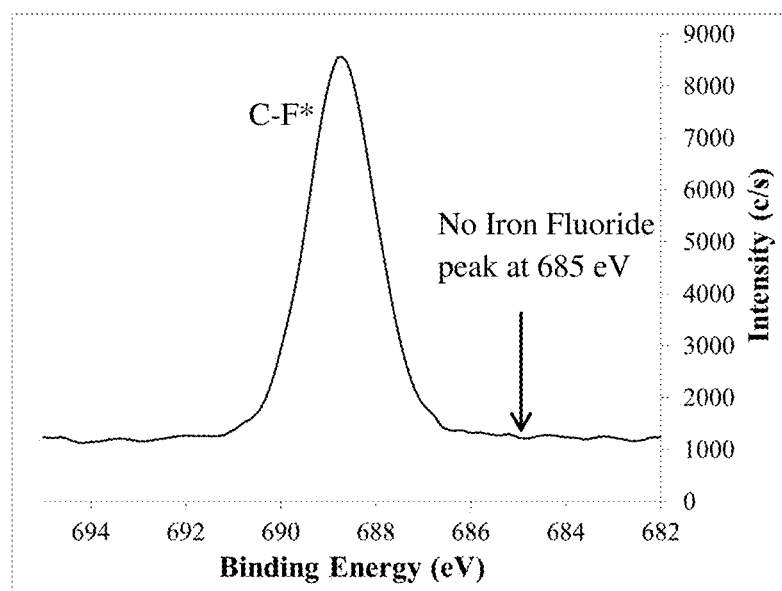
FIG. 5 is an X-ray photoelectron spectroscopy (XPS) graph depicting high-resolution F1s spectrum of the transfer film on the chrome steel ball rubbed against the PDA/PTFE film.

The thick, discontinuous nature of the transfer film observed in the microscope images for the counterface on PDA/PTFE, shown in FIG. 4(b), indicates that the transfer film is likely a build-up of material, repetitively formed and removed, with little adhesion strength to the counterface. To determine the chemical composition of the transfer film, an XPS high-resolution F1s spectrum of the transfer film was obtained. As seen in FIG. 5, the F1s spectrum of the transfer film showed a typical PTFE C—F* peak at a binding energy of 688.9 eV. There is no presence of an Iron-Fluoride peak typically found at approximately 685 eV, which would be expected if the transfer film had formed chemical bonds with the counterface. However, the thickness of the transfer film may prevent the detection of iron-fluorides at the interface of the chrome steel counterface and the transfer film.

Figure 6:
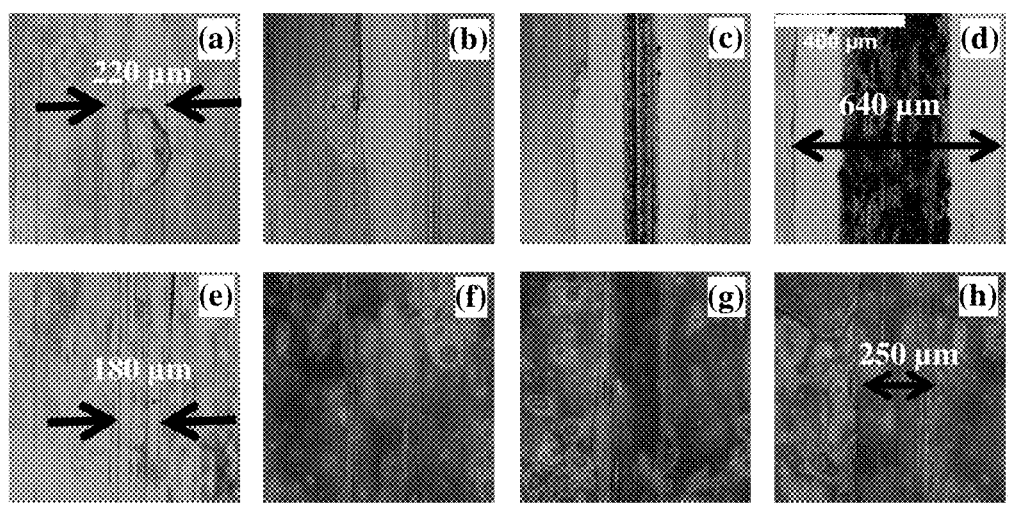
FIGS. 6(a)-(d) and 6(e)-(h) are optical microscope images of the wear track on a PTFE film sample rubbed for (a) 1 cycle, (b) 10 cycles, (c) 60 cycles, (d) 1000 cycles and on PDA/PTFE film sample rubbed for (e) 1 cycle, (f) 10 cycles, (g) 60 cycles and (h) 1000 cycles.

Optical images of the wear tracks on the samples after friction tests carried out for 1, 10, 60 and 1000 rubbing cycles can be seen in FIGS. 6(a)-6(h). For the PTFE only sample, as seen in FIGS. 6(a)-6(d), the wear track width after the first cycle is 220 µm and increases progressively with successive rubbing cycles. After 60 rubbing cycles, it is evident from the dark area in the middle of the wear track, as shown in FIG. 6(c), that the substrate is exposed and has been abraded. After 1000 cycles, shown in FIG. 6(d), the surface is significantly damaged, showing an even wider abraded area. However, the abraded area is only present at the center of the wear track, resulting from the counterface ploughing through the surface of the substrate. On either side of this abraded area, the film has also detached from the substrate due to the high shear forces produced during the rubbing test. The detachment or delamination of the film leaves an area of exposed but undamaged stainless steel and produces a total wear track width of approximately 640 µm. The delamination of the film is a result of the weak adhesion between the film and the substrate. The wear track for PDA/PTFE, shown in FIGS. 6(e)-6(h), reaches a width of about 180 µm after the first cycle, as shown in FIG. 6(e), and then slowly progresses to only 250 µm after 1000 rubbing cycles, as seen in FIG. 6(h). The minimum change in wear track width from the first cycle through 1000 cycles indicates that the wear of PDA/PTFE progressed much slower than for PTFE only, after the first rubbing cycle.

Figure 7:
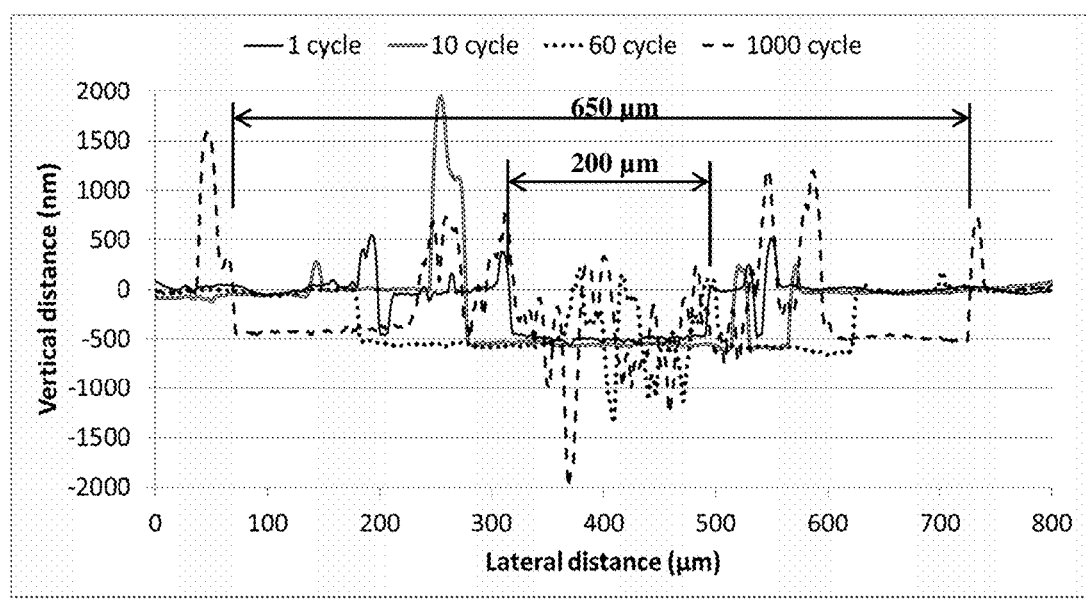
FIG. 7 is a graph depicting the cross-sectional profiles of the wear tracks for 1, 10, 60 and 1000 cycle friction tests on PTFE film.

The progression of the wear, indicated by the cross-sectional profile for each wear track, was measured using a Dektak stylus profiler. FIG. 7 shows the wear track profile for 1, 10, 60 and 1000 rubbing cycles on PTFE only. The depth of the wear track reached the film thickness of approximately 570 nm in the first cycle. The profile shows that after the first cycle, the wear track had a width of about 200 µm, and, as the cycles progressed, the width increased to about 650 µm. The peaks and valleys of high amplitude, which appear in the center of the wear track profile after 60 rubbing cycles, indicate that the counterface has dug into the stainless steel substrate. This shows that the film has been removed sufficiently to expose the substrate, allowing it to be abraded by the counterface.

Figure 8:
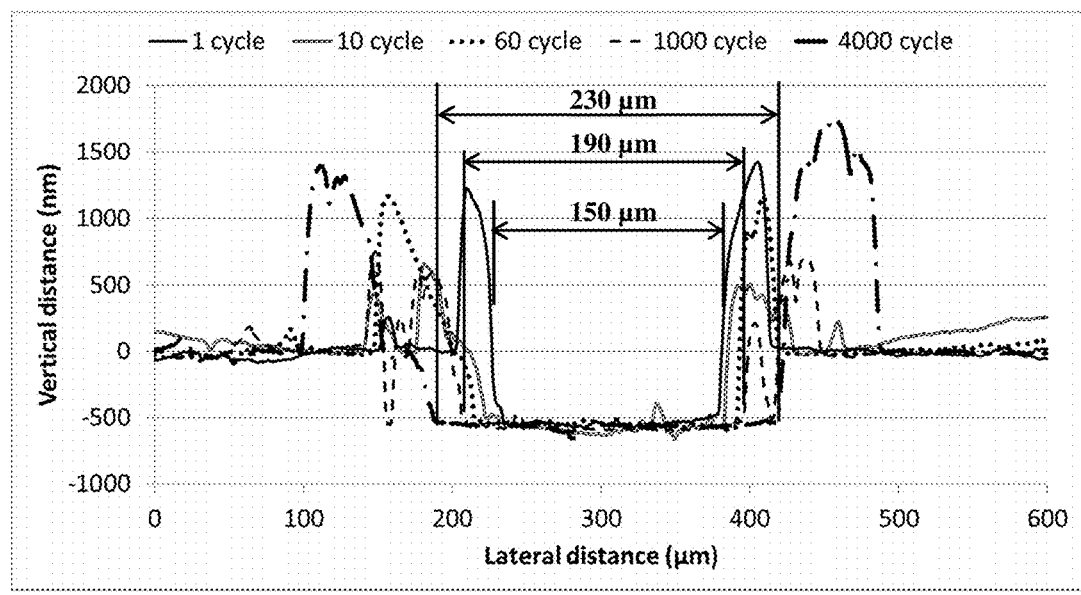
FIG. 8 is a graph depicting the cross-sectional profiles of the wear tracks for 1, 10, 60, 1000 and 4000 cycle friction tests on PDA/PTFE film.

The cross-sectional profiles for the PDA/PTFE sample wear tracks after 1, 10, 60, 1000, and 4000 rubbing cycles are shown in FIG. 8. The width of the wear track, measured from the cross sectional profile, starts at approximately 150 µm after 1 cycle, increases to 190 µm after 1000 cycles and finishes at 230 µm after 4000 cycles. The depth of the wear track immediately reaches about 560 nm and remains more or less the same for up to 4000 cycles. Comparing the depth of the wear track to the initial film thickness of 720 nm indicates that a film of approximately 160 nm (about 40 nm PTFE and 120 nm PDA) remains on the substrate for the majority of the rubbing test. These results shows that the majority of the top coat is removed in the first pass of the counterface and also that the majority of the PTFE top coat is unaffected by the incorporation of PDA. However, once the wear track reaches a depth just above the PDA coat, the wear progression slows down dramatically. The fact that the COF also remains low and stable for over 5370 cycles suggests that a thin tenacious layer of PTFE remains at the interface with PDA. This thin layer of PTFE is strongly bonded to the PDA and allows the PDA/PTFE sample to withstand a significantly larger number of rubbing cycles than PTFE only.

Figure 9:
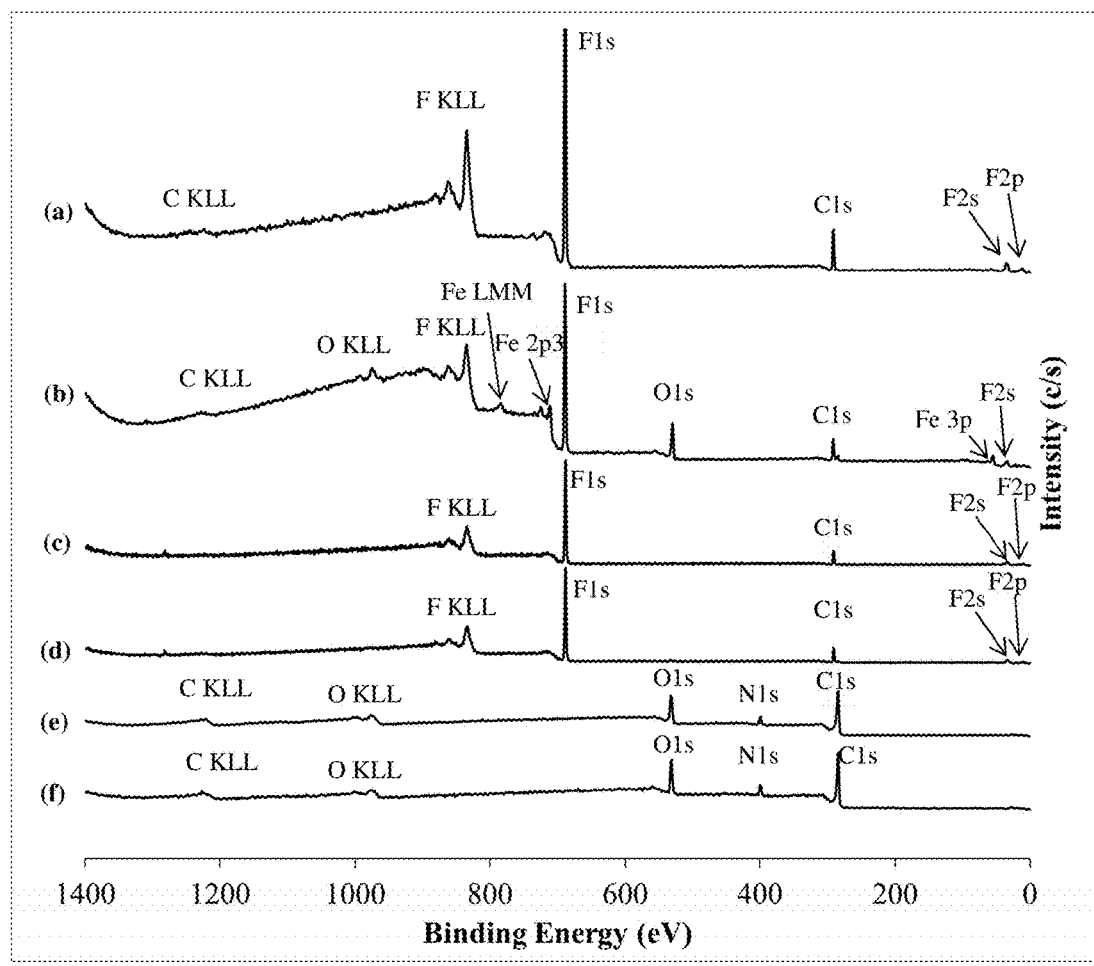
FIG. 9 is a graph depicting XPS survey spectra obtained (a) outside and (b) inside the wear track of PTFE coated stainless steel, (c) outside and (d) inside the wear track of PDA/PTFE coated stainless steel, as well as for stainless steel coated with PDA only (e) heated at 250° C. and (f) with no heat treatment.

In order to confirm the presence of a tenacious PTFE layer on PDA after extensive rubbing, an analysis of the chemical composition inside and outside the wear track was performed for both sample types using XPS. Each sample was analyzed after the durability test. The PTFE sample used was rubbed for 10 cycles, and the friction test was stopped as soon as the COF rose to 0.1. The PDA/PTFE sample was rubbed for 5400 cycles, and testing was also stopped as soon as the COF rose to 0.1. For the sample coated with PTFE only, a typical PTFE spectrum with a C1s peak at a binding energy of 292 eV and an F1s peak at 689 eV is observed outside the wear track, as shown in FIG. 9(a). To determine what chemical reactions may be taking place at the rubbing contact area, an XPS survey spectrum was also obtained inside the wear track. The spectrum, as shown in FIG. 9(b), reveals that the intensity of the F1s peak has decreased in comparison to the F1s peak outside the wear track, and an Fe 2p3 peak is now present at 711 eV. This indicates that there is less fluorine content inside the wear track and that the substrate is partially exposed. In addition, an oxygen peak at approximately 531 eV is also present inside the wear track. This peak is representative of the oxide layer formed on the exposed stainless steel surface. These results show that for the PTFE only sample, after only 10 rubbing cycles, the film is sufficiently penetrated to expose the substrate underneath it.

The XPS survey spectra obtained for PDA/PTFE are shown in FIGS. 9(c) and 9(d). The spectrum for the PDA/PTFE surface outside the wear track exhibits C1s and F1s peaks typically present in PTFE, as shown in FIG. 9(c). Inside the wear track of PDA/PTFE, after a 5400 cycle rubbing test, these same peaks are also present, but at slightly lower intensities, shown in FIG. 9(d). This confirms the PTFE film is still present inside the wear track. In addition, the absence of Fe peaks indicates that the substrate has not been exposed. Even after 5400 rubbing cycles, a PTFE film of at least 10 nm thick (photoelectron escape depth of XPS) is still present inside the PDA/PTFE wear track.

XPS analysis on PDA-only films with no heat treatment and PDA-only films heated at 250° C. are shown in FIGS. 9(e) and 9(f), respectively. This analysis was performed to test the effect of the heat treatment procedure on the PDA film and to confirm that the film has not degraded after heat treatment at 250° C. for 10 min. The survey spectra for both PDA with no heat treatment and PDA heat treated at 250° C. have similar peaks with only a slight decrease in intensity for the heat-treated surface. The spectra show the presence of O1s peaks at a binding energy of 532 eV, N1s peaks at 399 eV and C1s peaks at 285 eV, typical of PDA. Because the spectrum for heated PDA does not show the presence of new peaks resulting from the formation of new radicals, it is not likely that the film has degraded significantly.

Figure 10:
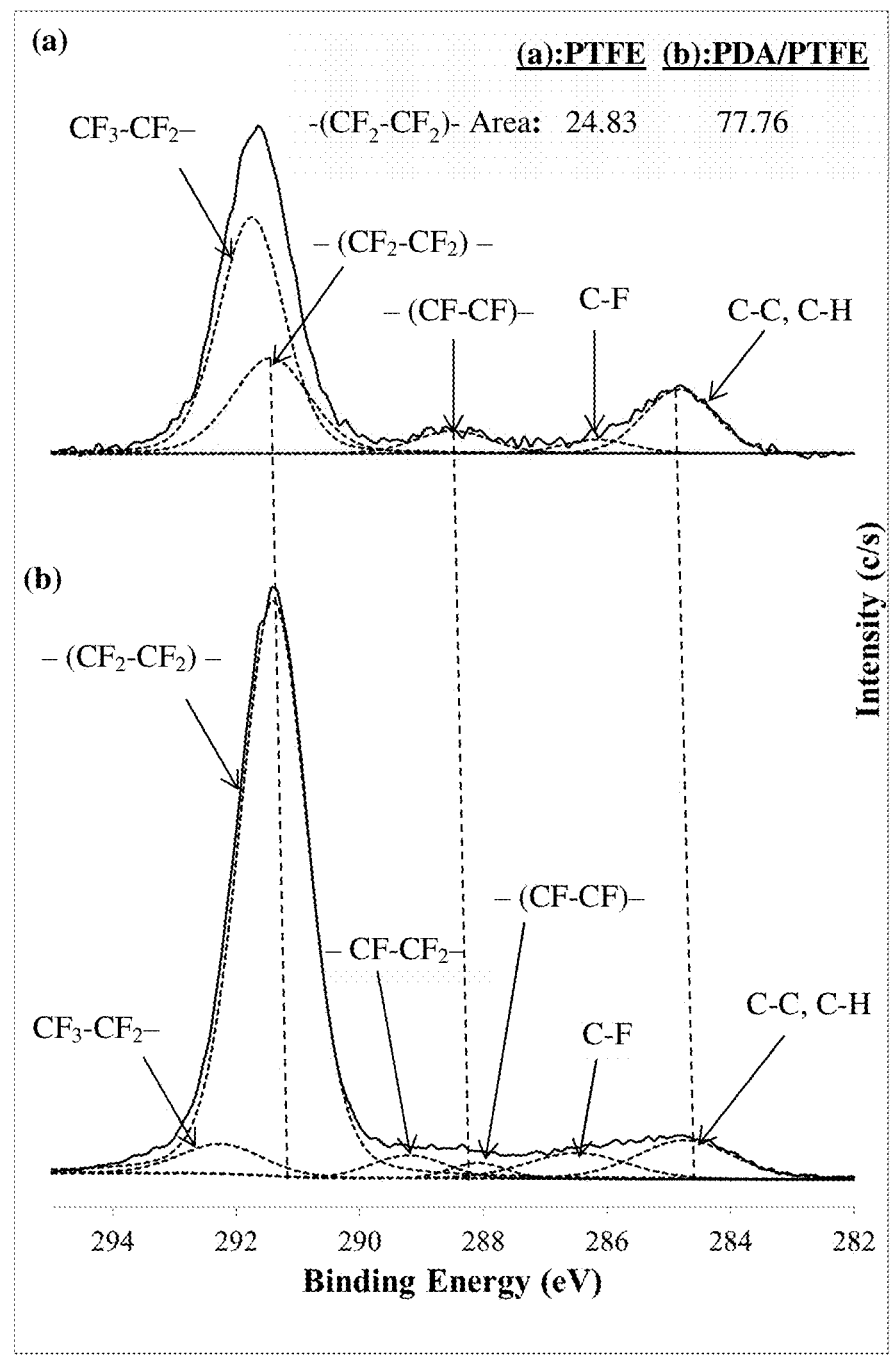
FIG. 10 is a graph depicting XPS high-resolution C1s spectra for the wear tracks on (a) PTFE film (10 cycles) and (b) PDA/PTFE film (5400 cycles).

For both PTFE and PDA/PTFE after 10 and 5400 respective rubbing cycles, high-resolution XPS scans in the C1s region were obtained inside the wear track to closely observe if new radicals may have been formed as a result of the high pressure rubbing. FIG. 10(a) shows the C1s spectrum for the PTFE wear track. The spectrum shows 5 peaks at binding energies of 291.8 eV, 291.4 eV, 288.5 eV, 286.2 eV and 284.8 eV, corresponding to CF3-CF2-, —(CF2-CF2)-, —(CF—CF)—, C—F and adventitious carbon, respectively. These peaks are characteristic of deconvoluted PTFE. This shows that, as a result of the high pressure rubbing, the PTFE chains have undergone scission, producing free radicals.

FIG. 10(b) shows the C1s spectrum for PDA/PTFE. The spectrum shows the same peaks as those observed for PTFE only, in addition to a peak at 289.5 eV corresponding to —CF—CF2-. This peak in the spectrum for PDA/PTFE is also typically found for deconvoluted PTFE C1s spectra and may not be present for the PTFE only sample because of the large difference in rubbing cycles between the two samples. In other words, with more rubbing cycles, a higher degree of scission of PTFE chains will occur and a larger variety of radicals will be formed. Furthermore, PDA/PTFE also shows a significantly larger area, 77.76, under the peak for —(CF2-CF2)-, which is the representative peak for unbroken PTFE molecules. The PTFE only sample, on the other hand, shows an area of only 24.83 for this peak. This shows that there is still a larger concentration of intact PTFE within the PDA/PTFE wear track, compared to PTFE only, despite the large difference in rubbing cycles.

Figure 11:
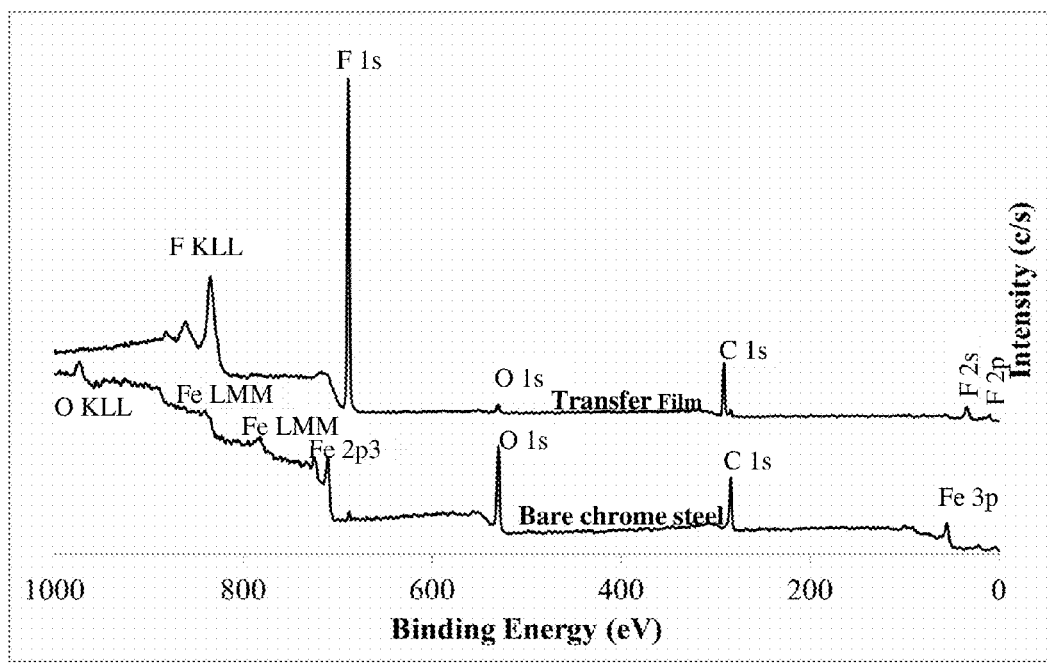
FIG. 11 is a graph depicting XPS survey spectra of the transfer film on the chrome steel ball rubbed against the PDA/PTFE film for 5400 cycles and XPS spectra of the chrome steel ball surface without a transfer film.

Finally, FIG. 11 shows the XPS survey spectra for the chrome steel ball rubbed against the PDA/PTFE sample for 5400 cycles. These spectra were obtained to determine if PDA had also transferred to the counterface. The counterface surface was analyzed at two locations, over the bare chrome steel surface and also directly over the transfer film. The bare chrome steel surface shows the presence of C1s, O1s and Fe peaks typically found in chrome steel. The transfer film, on the other hand, shows a typical PTFE spectrum with no presence of nitrogen, typically found in PDA. This indicates that the PDA film has not transferred to the counterface and confirms that the PDA layer of the film has not been reached during the extended rubbing.

For the method in example 1 it is evident that under relatively high contact pressures, a PDA/PTFE film of approximately 720 nm is able to withstand a rubbing test duration of 5370 cycles, approximately 500 times that of a PTFE film alone. More importantly, the majority of the test takes place at the interface between the counterface and about 160 nm of remaining film. This is because a tenacious layer of PTFE is strongly adhered to the PDA and not easily removed, contributing to the durability of the film.

Example 2

In this example the PTFE layer in the PDA/PTFE coating, according to the invention, is composed of a PTFE matrix having a graphene oxide (GO) filler. Graphene consists of single planar sheets of $sp^2$ bonded carbon atoms in a honeycomb crystal lattice. When many graphene sheets are stacked together they create flake graphite, which is a well-known solid lubricant used in tribology. Mixing graphene with aqueous PTFE solution to fabricate uniform coatings is troublesome due to difficulties dispersing graphene in solutions including water. The addition of functional oxygen groups, such as hydroxyl, epoxy, and ketone functionalities, across the basal plane and edges of graphene sheets creates GO. These functional oxygen groups allow for GO to be dispersed successfully in water making it possible to mix graphene oxide with an aqueous PTFE solution to fabricate uniformly dispersed PTFE films.

In order to fabricate the PDA/PTFE+GO coating, a 0.2% graphene oxide (by wt) dispersion in water is added to the PTFE dispersion using a 1:2 volume ratio (GO:PTFE) as the dip coating solution. To create PTFE+GO films around 1 micron thick, insertion and withdrawal speeds of 40 mm/min and immersion times of 20 seconds are used when dip coating all samples.

The samples are then heated above the melting point of PTFE while minimizing the cooling of the coating between each heating step. The samples are heated according to a modified DuPont procedure developed by the inventors hereof, which allows the PTFE particles to fuse together and form rod-like structures. DuPont's suggested heat treating process for their PTFE-TE 3859 dispersion is to heat at 120° C. for 2 minutes followed by heating at 300° C. for 5 minutes, and then heating above PTFE's melting temperature at 372° C. for 10 minutes. According to the invention, heat treatment consisted of drying on a hot plate at 120° C. for 2 minutes followed by heat treating in a preheated furnace at 250° C. for 3 minutes and finally heat treating in a separate pre-heated furnace at 372° C. for 3 minutes.

Figure 12:
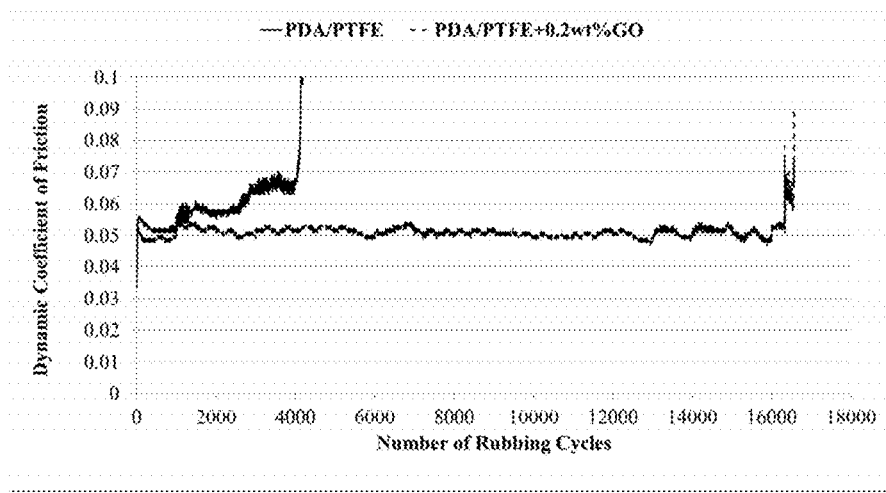
FIG. 12 is a graph comparing the dynamic coefficient of friction vs. rubbing cycles for the PDA/PTFE film and the PDA/PTFE+0.2% by wt graphene oxide.

The friction test carried out to determine the durability of the coating was similar to the process described in example 1 except the samples were rubbed in a direction perpendicular to the polishing lines of the stainless steel substrate. The results for the friction test are shown in FIG. 12. This figure shows the dynamic COF vs number of rubbing cycles. The durability of the film is determined by observing at which point there is a spike in the COF which is an indicator that the film has been sufficiently worn away so as to expose the substrate. The results show that when a 0.2% by wt GO filler is added to the PTFE film, the durability of the PDA/PTFE film is extended 4 times. The PDA/PTFE+GO composite film was able to maintain a low COF of around 0.05 for the duration of the durability tests, which is lower than the 0.06 observed for PDA/PTFE.

Figure 13:
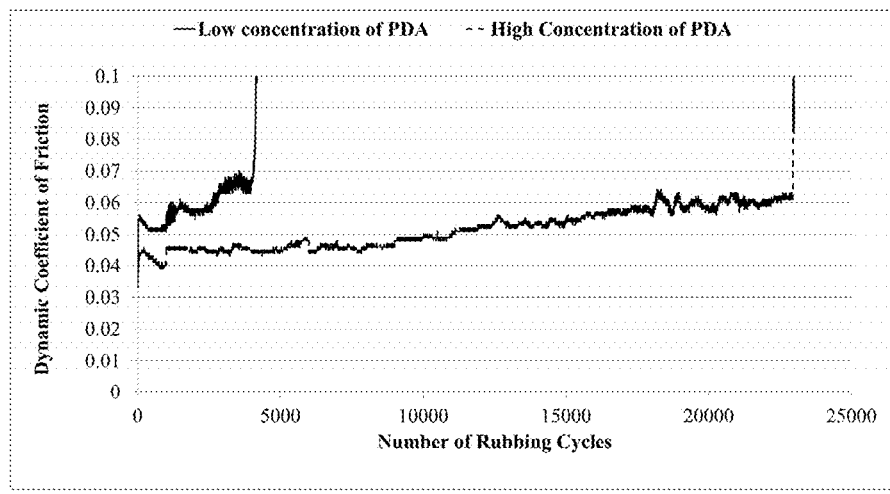
FIG. 13 is a graph depicting the dynamic coefficient of friction vs. rubbing cycles for two different concentrations of PDA on PDA/PTFE films rubbed to failure.

FIG. 13 shows the importance of ensuring a uniform high concentration of PDA on the substrate surface prior to deposition of PTFE. For similar PTFE coating thicknesses, a higher concentration of PDA increased the durability of PDA/PTFE films nearly 6 times from failing at 4278 cycles to failing at 22954 cycles.

The present invention has been described with reference to certain preferred and alternative embodiments that are intended to be exemplary only and not limiting to the full scope of the present invention. Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein. All references cited herein are hereby incorporated by reference to the extent that there is no inconsistency with the disclosure of this specification.

REFERENCE LIST

[1] B. Bhushan, Modern Tribology Handbook, CRC Press, Boca Raton, Fla., 2001.
[2] H. Unal, A. Mimaroglu, U. Kadioglu, H. Ekiz, Sliding friction and wear behaviour of polytetrafluoroethylene and its composites under dry conditions, Mat. Des. 25 (2004) 239-245.
[3] W. G. Sawyer, D. L. Burris, Improved wear resistance in alumina-PTFE nanocomposites with irregular shaped nanoparticles, Wear. 260 (2006) 915-918.
[4] X. Cheng, Y. Xue, C. Xie, Friction and wear of rare-earth modified glass-fiber filled PTFE composites in dry reciprocating sliding motion with impact loads, Wear. 253 (2002) 869-877.

[5] S. E. McElwain, T. A. Blanchet, L. S. Schadler, W. G. Sawyer, Effect of particle size on the wear resistance of alumina-filled PTFE micro- and nanocomposites, Tribol. Trans. 51 (2008) 247-253.

[6] D. Xiang, K. Li, W. Shu, Z. Xu, On the tribological properties of PTFE filled with alumina nanoparticles and graphite, J. Reinf. Plast. Compos. 26 (2007) 331-339.

[7] K. Holmberg, A. Matthews, Coatings tribology: properties, mechanisms, techniques and applications in surface engineering/Kenneth Holmberg, Allan Matthews, in: Amsterdam; Boston; London: Elsevier Science, 2009.

[8] B. Podgornik, J. Vizintin, Tribology of thin films and their use in the field of machine elements, Vacuum. 68 (2002) 39-47.

[9] V. Eustathios, Fluoropolymer primer having improved scratch resistance, U.S. Pat. No. 4,049,863A (1977).

[10] H. P. Tannenbaum, Non-stick coating system with PTFE-FEP for concentration gradient, U.S. Pat. No. 5,230,961A (1993).

[11] H. Lee, Bioadhesion of Mussels and Geckos: Molecular Mechanics, Surface Chemistry, and Nanoadhesives, 2008.

[12] S. Beckford, M. Zou, Wear resistant PTFE thin film enabled by a polydopamine adhesive layer, Appl. Surf. Sci. 292 (2014) 350-356.

[13] H. Lee, S. M. Dellatore, W. M. Miller, P. B. Messersmith, Mussel-inspired surface chemistry for multifunctional coatings, Science. 318 (2007) 426-430.

What is claimed is:

1. A method for forming a durable polytetrafluoroethylene coating on a substrate, comprising
    (a) contacting the substrate with a dopamine solution undergoing an oxidative polymerization reaction to form a 5 nm to 500 nm thick polydopamine coating on the substrate surface;
    (b) depositing an aqueous dispersion of polytetrafluoroethylene on the formed polydopamine coating on the substrate to form the polytetrafluoroethylene coating thereon; and
    (c) heating the coated substrate after step (b),
    thereby forming a stack structure comprising the polytetrafluoroethylene coating formed on the polydopamine coating that is, in turn, formed on the substrate.

2. The method of claim 1, wherein the substrate comprises stainless steel.

3. The method of claim 1, wherein the polytetrafluoroethylene coating has a thickness in a range of about 0.01-20 µm.

4. The method, of claim 1, wherein each of the steps (a) and (b) is performed by a dip coating, spray coating, spin coating, or roll coating process, or any combination thereof.

5. The method of claim 1, wherein the heating step is performed at a temperature in a range of about 120° C. to 372° C.

6. The method of claim 1 wherein the stack structure comprises more than one layer of polydopamine and polytetrafluoroethylene producing multiple intercalated layers of polydopamine and polytetrafluoroethylene.

7. The method of claim 1, wherein said polytetrafluoroethylene coating comprises polytetrafluoroethylene and a wear reducing filler.

8. The method of claim 7, wherein the filler comprises any one or more of alumina, graphite, silica and copper nanoparticles.

9. The method of claim 1, wherein said polytetrafluoroethylene coating withstands 500 times more rubbing cycles than a polytetrafluoroethylene coating on a substrate without a polydopamine base.

10. The method of claim 1, wherein the coefficient of friction of said polytetrafluoroethylene coating is stable for at least 1000 rubbing cycles.

11. The method of claim 10, wherein said coefficient of friction is about 0.06 for about 1000 rubbing cycles.

12. The method of claim 10, wherein said coefficient of friction is about 0.06 to 0.1 for up to about 5370 rubbing cycles.

13. A method for forming a durable polytetrafluoroethylene and graphene oxide composite coating on a substrate, comprising
    (a) contacting the substrate with a dopamine solution undergoing an oxidative polymerization reaction to form a 5 nm to 500 nm thick polydopamine coating on the substrate surface;
    (b) providing a composite aqueous dispersion comprising polytetrafluoroethylene and graphene oxide;
    (c) depositing the composite dispersion on the formed polydopamine coating on the substrate to form a polytetrafluoroethylene and graphene oxide composite coating thereon; and
    (d) heating the coated substrate after step (c),
thereby forming a stack structure having the polytetrafluoroethylene and graphene oxide composite coating formed on the polydopamine coating that is, in turn, formed on the substrate.

14. The method of claim 13, wherein the substrate comprises stainless steel.

15. The method, of claim 13, wherein the polytetrafluoroethylene and graphene oxide composite coating has a thickness in a range of about 0.01-20 µm.

16. The method, of claim 13, wherein each of the depositing steps (a) and (c) is performed by a dip coating, spray coating, or roll coating process, or any combination thereof.

17. The method of claim 13, wherein the heating step is performed at a temperature in a range of about 120° C. to 372° C.

18. The method of claim 13, wherein the composite dispersion is produced by combining a polytetrafluoroethylene dispersion with a graphene oxide dispersion that comprises 0.1 to 5 wt. % of graphene oxide.

* * * * *